(12) United States Patent
Todasco (10) Patent No.: US 10,346,827 B2
(45) Date of Patent: Jul. 9, 2019

(54) DISPLAY OF A TRANSACTION HISTORY USING A PAYMENT CARD DISPLAY DEVICE FOR SECURE TRANSACTION PROCESSING

(71) Applicant: PAYPAL, INC., San Jose, CA (US)

(72) Inventor: Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 495 days.

(21) Appl. No.: 14/973,559

(22) Filed: Dec. 17, 2015

(65) Prior Publication Data

US 2017/0178115 A1    Jun. 22, 2017

(51) Int. Cl.
*G06Q 20/32* (2012.01)
*G06Q 20/36* (2012.01)

(52) U.S. Cl.
CPC ......... *G06Q 20/327* (2013.01); *G06Q 20/367* (2013.01)

(58) Field of Classification Search
CPC .................................................. G06Q 20/327
See application file for complete search history.

(56) References Cited

U.S. PATENT DOCUMENTS

| | | | | |
|---|---|---|---|---|
| 7,975,927 B1 * | 7/2011 | Whitney | ............ | G06K 19/0704 235/492 |
| 8,517,279 B2 * | 8/2013 | Granucci | ............ | G06Q 20/105 235/379 |
| 8,830,160 B2 * | 9/2014 | Gila | ....................... | B41J 3/4076 345/107 |
| 2011/0279242 A1 * | 11/2011 | Krawczewicz | .... | G06K 19/0701 340/10.6 |
| 2012/0024945 A1 * | 2/2012 | Jones | .................... | G07F 7/0833 235/379 |
| 2012/0325905 A1 * | 12/2012 | Kim | ................. | G06K 19/07707 235/380 |
| 2013/0087627 A1 * | 4/2013 | Marseille | ........... | G06K 19/0716 235/492 |
| 2016/0034996 A1 * | 2/2016 | Min | ................... | G06Q 30/0623 705/26.61 |
| 2016/0104161 A1 * | 4/2016 | Butler | .................. | G06Q 20/409 705/44 |
| 2016/0267486 A1 * | 9/2016 | Mitra | .................... | H04L 9/3231 |

* cited by examiner

*Primary Examiner* — Eric T Wong
(74) *Attorney, Agent, or Firm* — Haynes and Boone, LLP (57) ABSTRACT

There are provided systems and methods for display of a transaction history using a payment card display device for secure transaction processing. A user may visit a merchant location for a merchant and purchase one or more items from the merchant using a payment card. The payment card may be equipped with a display device, as well as an antenna or other communication module. Once the payment card is processed for the transaction, a merchant device at the merchant location may communicate a message to the payment card for display on the display device of the payment card. The message may include information of whether the transaction was processed, an amount for the transaction, and/or a number of transactions processed. Thus, the user may be informed of how much was charged to the payment card and whether the payment card was incorrectly processed.

20 Claims, 5 Drawing Sheets

DISPLAY OF A TRANSACTION HISTORY USING A PAYMENT CARD DISPLAY DEVICE FOR SECURE TRANSACTION PROCESSING

TECHNICAL FIELD

The present application generally relates to use of low energy display devices on payment cards and short range wireless communications, and more specifically to display of a transaction history using a payment card display device for secure transaction processing.

BACKGROUND

A user, such as a consumer, at a merchant location for a merchant may select one or more items for purchase, and may engage in a transaction with the merchant in order to purchase the items. Traditionally, the user may utilize cash or check to pay for the transaction, and thus may easily view how much the user has paid. However, more modernly, a user may utilize payment cards, such as debit or credit cards, when paying for a transaction. These payment cards allow for quick payment processing using backend payment processing systems to send a payment to a merchant account from a financial account or extended credit for the user. The merchant may provide receipts for processing; however, often the receipts are difficult to read or process, or may be immediately disregarded and thrown away by the user. In this regard, the user may be unaware of errors in the transaction, for example, if the payment card is swiped more than once through a magnetic card reader and processed multiple times. Moreover, if the amount entered by the merchant was incorrect, the user may be unaware, and later be required to review a billing statement and dispute transactions. Thus, without immediate information of the processed transaction, the user may be in danger of erroneous transactions and/or fraud.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for display of a transaction history using a payment card display device for secure transaction processing. Systems suitable for practicing methods of the present disclosure are also provided.

Various merchant locations for merchants may provide one or more products, goods, or services (referred to herein as an "item" or "items") for sale to users. The merchant locations include physical merchant locations where the users may visit in order to select items for purchase and engage in a transaction with the merchant at the respective merchant location. After shopping at the merchant location and selecting items for purchase, the user and/or merchant may initiate a transaction, for example, by entering items to a merchant device through scanning of item barcodes, selection of items on an interface of the merchant device, entry of item identifiers, entry of item price, or otherwise providing transaction information to the merchant device. The merchant device may therefore correspond to a point of sale (POS) device, which may include various features and components such as a display, input devices, processor, memory, magnetic card reader and/or contactless card reader (e.g., using near field communications (NFC), RFID reader, etc.), network interface component for network communications, cash register, and/or other components used during transaction processing. The merchant device may be used to process a transaction using a payment card, such as a credit or debit card. For example, on receipt of an identifier for the payment card (e.g., through swiping a magnetic stripe of the card through the magnetic card reader, reading the identifier from a memory through an antenna embedded with the memory over short range wireless communications, and/or entering a card number or identifier through a keypad), the merchant device may contact a backend payment card processor, such as a credit provider, bank, or other financial institution.

For example, the merchant may accept Visa®, Discover®, American Express®, PayPal®, and/or Venmo® at a specific merchant location when the user wishes to pay for a transaction. The merchant device may provide the transaction information, such as a price or cost of the transaction, with the card identifier and request payment to the merchant, for example, to an account for the merchant. The payment card processor may then process a payment to the merchant using the account of the merchant, the transaction information, and the card identifier. In various other embodiments, the payment card may correspond to an online payment provider, such as PAYPAL®, which may provide payment using a payment account of the user on receipt of transaction information and an identifier for the payment card. In various embodiments, a payment may not be processed where the payment provider cannot process the transaction, for example, where fraud is detect, if the user has insufficient funds, or other problem occurs during transaction processing.

The merchant may provide a transaction history to the user, such as a physical receipt where the user is required to sign in order to verify and record that the user authorized the transaction. The transaction history may also show a reason for denial or failure of processing the transaction, such as insufficient funds. The merchant may also provide electronic receipts, which may be sent through text message, email, or other communications to an electronic account or device of the user for storage. However, the user may not wish the save, review, or receive a receipt for a transaction. Thus, in order to alert the user of the results of transaction processing, the merchant device may generate a message for output through a display device of the payment card. In this regard, various merchant locations may provide short range wireless communications with users' payment cards, such as through merchant devices and/or wireless beacons using Bluetooth Low Energy (BLE), LTE Direct, WiFi, or other communications that emit a radio frequency (RF) signal capable of communicating with the user's payment cards. The wireless beacons may correspond to a device that provides short range wireless communications with payment cards. These merchant devices and/or beacons may be set up at the merchant location, such as at or nearby an entrance to the merchant location, throughout the merchant location and sub-areas of the merchant location (e.g., at sales aisles, booths, or other sub-areas), and/or at checkout counters where a user pays for a transaction. The merchant devices and/or beacons may communicate with payment cards in possession of users in order to connect to the payment card. In another embodiment, the merchant devices and/or wireless beacons may communicate with a user's mobile device and the mobile device may further communicate and connect to the payment card. In this regard, the merchant devices and/or beacons may provide proximity detection of users and triangulation of user's positions/locations nearby or within the merchant location through the user's mobile device.

Thus, the payment card includes at least a display device and an antenna or other communication component to connect with the merchant device and/or wireless beacon and receive a communication (e.g., a message including the transaction status and/or payment status). In certain embodiments, if the user's payment card contains a light emitting diode (LED), the wireless beacon may communicate a message to activate the LED to turn on in order to notify the user that the transaction is processed or not processed, as discussed herein. Additional LEDs may be used to provide further information, including alphanumeric text information, color coded alerts, etc. In other embodiments, the payment card may incorporate an E INK® display or other electronic paper or ink display, wherein the merchant server and/or payment service provider through the wireless beacon may communicate a message for display by the payment card. The display may also correspond to a liquid crystal display (LCD) or other type of display device, which may display the message to the user. In various embodiments, the payment card may include additional components, such as a power supply, hardware processor, non-transitory memory, applications residing the in the non-transitory memory and executable by the hardware processor, and/or short range wireless communication module for interfacing with a device of the user (e.g., mobile smart phone).

When establishing a connection, the merchant device or beacon may emit a communication signal including an identifier for the beacon, the merchant, and/or a payment provider service administering the merchant devices and/or beacons. When the payment card detects the signal and authenticates the one or more identifiers, both the payment card and the merchant device/beacon may ramp up in power and establish a connection, where the connection may further enable the payment card to communicate additional data to the merchant device/wireless beacon, such as identification data (e.g., issuer and type of payment card). In other embodiments, the antenna or other communication module of the payment card may be passive, and respond to a signal emitted by the merchant device or wireless beacon. The sophistication of the connection may facilitate separate and discrete connections with multiple payment cards should they be within range of the beacon. Thus, the merchant device/beacon enables the payment card to establish a connection, authenticate itself, and/or transmit one or more messages to the payment card.

The merchant device may determine the message using the results of processing the transaction between the user and the merchant. For example, the message may include whether the transaction was processed or declined. Furthermore, the message may also include additional transaction information, such as an amount processed for payment to the merchant for the transaction. The message may include a number of transactions processed, for example, if the payment card is accidentally swiped two or more times for a single transaction, and thus the user is charged twice. In other embodiments, the user may have multiple transactions and may be informed that each has been correctly processed. Thus, the message may be specific to a single transaction or may include multiple transactions using the same card identifier. The message may also present a name of the merchant and/or merchant location, or other merchant information that identifies the merchant. Furthermore, the merchant device may generate the message to include a name or identifier of a payment provider performing the payment processing, and/or a payment account used to process the payment (e.g., in the instance that multiple payment providers and/or payment accounts are available for processing). Additional fees added to the transaction may also be included in the message, for example, credit card fees, tax, etc.

The message may be communicated in various message formats. For example, where the payment card includes a simple LED or LEDs as the or part of the display device, the message may cause the LED to light up, flash, or display a certain color (e.g., in the case of multi-color LEDs). The LED may also flash or blink for a number of swipes or processed transactions, or may present other codes associated with the transaction results, including red for debits, green for credits, another color or code signifier to display a declined transaction, etc. However, where the display device of the payment card is more complex and may present further information, including alphanumeric text and/or symbols, the message may be presented on the display device with message content, such as a text display or voice output, which may include one or more of the aforementioned messages (e.g., merchant name, payment amount, etc.). The message may also include color coded information, which may be utilized to show a credit or debit (e.g., green or red, respectively) for the transaction. Other coded messages may also be provided, including a minus sign for a debit, a plus sign of a credit, a number of processed transactions, or other information. Moreover, the user may interact with the display device where the payment card includes an input mechanism or component (e.g., buttons, touch interface, etc.). The input mechanism may allow the user to scroll through the message, hide the message, display the message, store or delete the message, and/or view other messages for other transactions or parts of the transaction (e.g., in the case of multiple transaction processing during a single shopping session at a merchant location). The message may utilize other components and/or resources of the payment card, such as the power component, processor, applications, or other component to cause display of the message to the user. In various embodiments, the payment card may also prevent unauthorized reception of the message by utilizing an antenna responsive only at certain frequencies and/or a processor and associated hardware to having encryption/decryption keys/algorithms, which may receive specialized communications (e.g., messages) at the merchant location.

The message may be presented on the display device for a predetermined amount of time, which may be configurable by the user with the payment card and/or the merchant in the message. For example, the message may display for five minutes to allow the user time to review the message. In other embodiments, the amount of time may be until a next transaction, or may provide the user enough time to leave the merchant location. Display and/or removal of the message on the display device of the payment card may also be location based. For example, the message may be communicated through short range wireless communications at the merchant location, and may remain until the communication link is ended by the user leaving the merchant location or traveling outside of the communication range for the short range communications. In other embodiments, a mobile device of the user may be utilized to detect a location of the user and cause display or removal of the message from the payment card. Where the payment card includes input components, the user may cause removal of the message, or the message may be removed when the user causes storage of the message to the payment card or another device.

Thus, the message may be stored to a database, which may be included within the payment card or may be external to the payment card. The database may include other messages, and may be accessible by the payment card or another device for updating, retrieving, adding, and/or deleting information (e.g., additional messages). Where the database is included within the payment card, the database may be stored to a non-transitory memory of the payment card. The payment card may make the database accessible to other devices, for example, through a wired or wireless communication link to the other devices. In other embodiments, the payment card may communicate the message to a device for the user for storage, such as a mobile device having a payment application associated with a payment provider (e.g., a banking application, online payment provider application, etc.). The message may include a transaction history or other transaction information, and may update a transaction log or statement (e.g., a monthly billing or history statement) on the payment application. Moreover, the payment application on the device may interface with the payment provider in order to update the payment provider of the message and/or transaction information communicated to the payment card. The payment provider may utilize the message for purposes of fraud detection, account security, and/or account balancing. For example, if a new transaction is posted to the user's account statement based on a payment using the payment card, but the message is not received from a mobile device of the user, the payment provider may alert the user that the card is being used while the user or the user's mobile device is not present and may be indicative of fraud.

Figure 1:
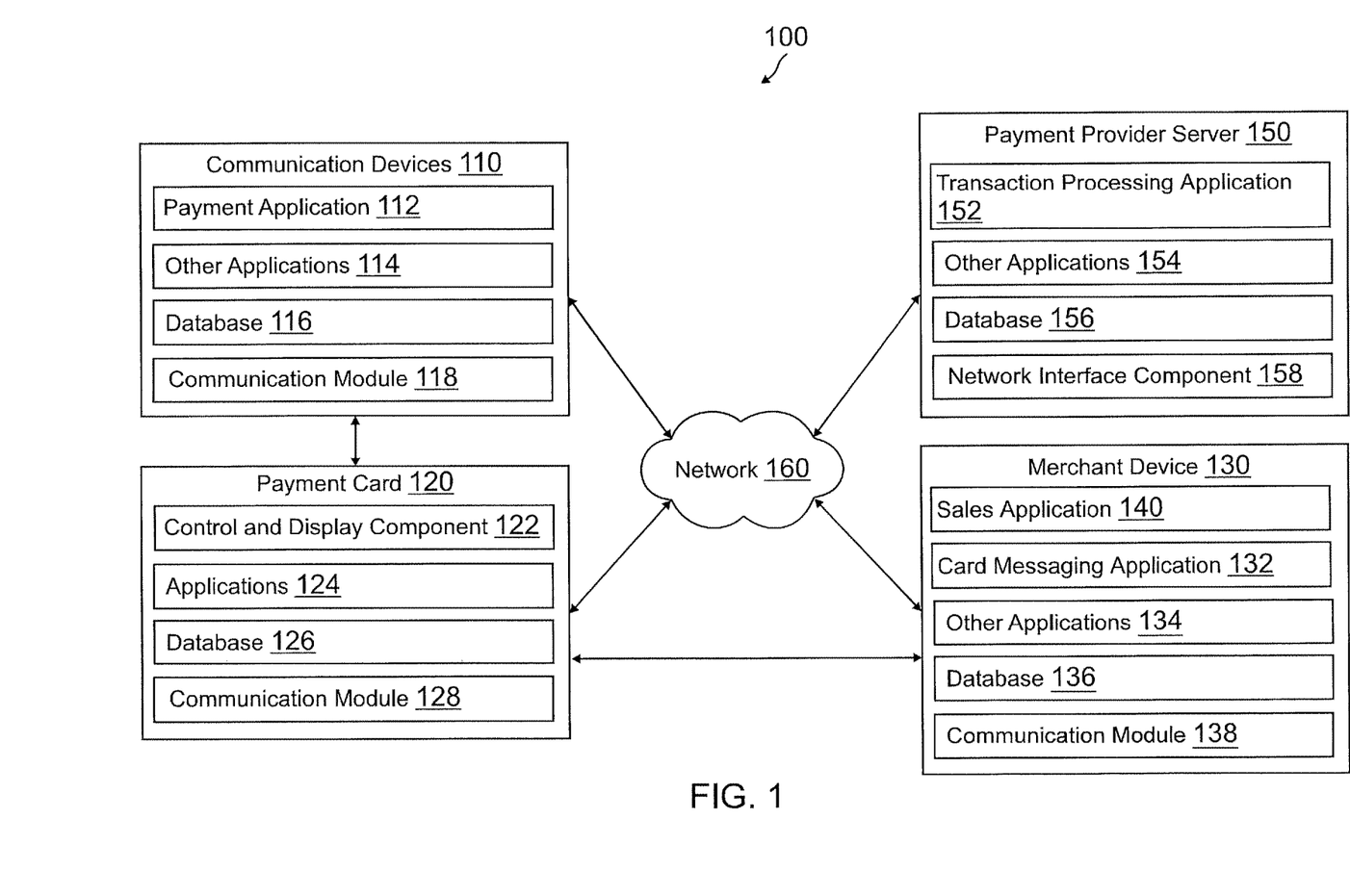
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes the user, a communication device 110, a payment card 120, a merchant device 130, and a payment provider server 150 in communication over a network 160. The user may travel to a merchant location associated with merchant device 130 with payment card 120 in order to shop for one or more items. While at the merchant location, the user may select one or more items for purchase, which may be entered to a transaction. In order to pay for and process the transaction, the user may provide payment card 120, which may provide a payment card identifier used to receive payment using a payment processing system, such as payment provider server 150. Merchant device 130 may receive results of processing the transaction using payment card 120. Merchant device 130 and/or a wireless beacon at the merchant location may connect to payment card 120 and effectuate a data transfer to payment card 120, which may include a message having the results from payment processing. Payment card 120 may further communicate the message to communication device 110 for storage with a payment application and/or digital wallet associated with payment provider server 150.

Communication device 110, payment card 120, merchant device 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with payment card 120, merchant device 130, and/or payment provider server 150. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although a single communication device is shown, a plurality of communication devices may functions similarly.

Communication device 110 of FIG. 1 contains a payment application 112, other applications 114, a database 116, and a communication module 118. Payment application 112 and other applications 114 may correspond to executable processes, procedures, and/or applications with associated hardware. In other embodiments, communication device 110 may include additional or different modules having specialized hardware and/or software as required.

Payment application 112 may correspond to one or more processes to execute software modules and associated devices of communication device 110 to enter one or more payment instruments or other funding sources for storage in a digital wallet associated with a payment account (e.g., stored and/or serviced by payment provider server 150), access the digital wallet and/or payment account for use, and update the digital wallet using received messages and/or transaction histories from payment card 120. In this regard, payment application 112 may correspond to specialized hardware and/or software utilized by a user of communication device 110 that provides an interface to permit payee users to enter input and other data for payment instruments, for example, through an input device (e.g., touch screen with a graphical user interface displayed by payment application 112, keypad/keyboard, mouse, etc.) and/or through a data capture device (e.g., scanner, camera, other optical device, etc.). The payment instruments may correspond to a payment card, such as payment card 120, which may correspond to a credit card, debit card, and/or physical card associated with an online account with payment provider server 150. In various embodiments, information for the payment account may also be stored to communication device 110 for use in an offline environment. The payment account accessible through payment application 112 may be used to initiate, receive, and/or process/complete transactions, including transactions processed using payment card 120. Once entered, the payment instruments may be communicated to payment provider server 150 over network 160 by payment application 112 for establishment and/or maintenance/update of the payment account and/or entry into the digital wallet. Additional benefits may be stored to the payment account, such as rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Payment application 112 may be implemented as a user interface enabling the user to select and provide payment. In various embodiments, payment application 112 may include a general browser application configured to retrieve, present, and communicate information over the Internet (e.g., utilize resources on the World Wide Web) or a private network. For example, payment application 112 may provide a web browser, which may send and receive information over network 160, including retrieving website information (e.g., a website for payment provider server 150) through a URL address provided by payment provider server 150, presenting the website information to the user, and/or communicating information to the website, including payment information for payment through payment provider server 150. However, in other embodiments, payment application 112 may include a dedicated application of payment provider server 150 or other entity (e.g., a merchant), which may be configured to provide payment account services and process financial transactions.

In this regard, payment application 112 may be utilized to provide online and real-world payments, for example, through entry or selection of merchant information and/or transaction information and initiating a payment for a transaction using the online account or financial instrument stored to the digital wallet. As discussed herein, payment application 112 may utilize user financial information, such as a credit card, bank account, or other financial account, as a payment instrument when providing payment information. Additionally, payment application 112 may utilize a user account with payment provider, such as payment provider server 150, as the payment instrument. Selection of a payment instrument may occur prior to, at, or after establishment of the financial process. Payment provider server 150 may then use the payment instrument during processing of payment, as discussed herein with respect to payment provider server 150.

However, in other embodiments, payment card 120 may be utilized to provide payment for a transaction, as discussed herein. For example, payment card 120 may provide an identifier used to process a payment using payment provider server 150 or another credit extension service, banking service, or other financial service provider. The identifier for payment card 120 may be permanently stored to payment card 120, for example, using a magnetic stripe readable by a magnetic card reader, an NFC chip, or other non-transitory readable storage medium. However, where communications between payment application 112 and payment card 120 are utilized, payment application 112 may be used to select a financial instrument and communicate an identifier to payment card 120 for storage and use in transactions. In this regard, a credit or debit card identifier, payment account identifier, or other financial account identifier may be selected by the user of communication device 110 and communicated to payment card 120 for short term or long term storage. Payment card 120 may then utilize the identifier, as discussed herein.

Payment application 112 may be utilized to view the results of payment, for example, using transaction histories, dispute resolution processes, and other post-transaction process. Such transaction histories may be retrievable from payment provider server 150, for example, as a statement for a financial instrument (e.g., monthly billing or use statement) or as individual transactions. The results of a payment and/or transaction may also be communicated to communication device 110 from payment card 120, as discussed herein. Payment application 112 may receive communications from payment card 112, and present to communications to a user through an application interface. Additionally, payment application 112 may be used to associate received communications, including messages, payment results, and/or transaction histories, with an account of the user, such as the account associated with payment card 112. Thus, payment application 112 may be used to provide fraud monitoring by matching transactions processed using payment card 120 with online transaction information retrievable from payment provider server 150.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/ or merchant applications. Other applications may be used to communicate a URL address to a payer or other user (e.g., payer devices 120).

Other applications 114 may also include connection applications, which may be used to connect with payment card 120, for example, using short range wireless communications. Thus, other applications 114 may be used to send data to and receive data from payment card 120. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices, including GUI's capable of displaying information to users and other output devices, including speakers. Communication device 110 may include input devices, including touch screens. Communication device 110 may include a sensor or other component used to collect the current information associated with the user, such as an input device, a camera, a microphone, an accelerometer, a motion detector, an environmental sensor, and/or a biometric sensor.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to payment provider server 150. Where applicable, information used by payment application 112 may be stored to database 116 (e.g., payment account and/or digital wallet information). Such information may further include messages received from payment card 120, including transaction histories for transactions processed using payment card 120.

Communication device 110 includes at least one communication module 118 adapted to communicate with payment card 120, merchant device 130, and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Payment card 120 may correspond to a physical card or other object (including key fobs and other types of hardware devices) used to process payments at a physical or electronic merchant location by providing an identifier for an account associated with payment card 120 that may be used in a transaction by a merchant to receive a payment from the account. In this regard, payment card 120 may include a storage medium to store the identifier for the card, such as a coded magnetic strip, NFC payment chip having a passive antenna and a memory module, and/or physical card material having a printed or embedded alphanumerical identifier code. Thus, the identifier may be retrievable through contact or contactless mechanisms, including a magnetic card reader, chip reader, and/or short range wireless communication mechanism. Other types of payment cards and identifier storages may also be used. Payment card 120 may be associated with another account, including a credit account (e.g., where payment card 120 is a credit card), bank account (e.g., checking or savings account where payment card 120 is a debit card), and/or an online electronic payment account with payment provider server 150. Other types of cards may also be used, including gift cards, pre-funded payment cards, etc. Although only one payment card is shown, a plurality of payment cards may function similarly.

Payment card 120 of FIG. 1 contains a control and display component 122, applications 124, a database 126, and a communication module 128. Control and display component 122 and applications 124 may correspond to executable processes, procedures, and/or applications with associated hardware. In other embodiments, payment card 120 may include additional or different hardware and software as required. For example, payment card 120 may include a power supply or other requisite components.

Payment card 120 may be implemented as a contact or contactless smart card capable of transferring and receiving data, including messages associated with transaction and payment processing results, using a short range wireless communications with merchant device 130. Payment card 120 may include a control and display component 122 (e.g., a microprocessor, processor element, or other logic element) that is configured to execute data processing operations for data stored in database 126 and/or receivable using communication module 128. In this regard, control and display component 122 further includes at least a display device. In certain embodiments, the display device may correspond to a single or multiple LEDs, which may convey messages through coded displays, such as activating, switching on and off, or otherwise outputting a signal. Additional LEDs may be used to provide further information, including alphanumeric text information, color coded alerts, etc. In other embodiments, the display device may incorporate an E INK® display or other electronic paper or ink display, which may display text messages, as well as images and/or symbols. The display may also correspond to a liquid crystal display (LCD) or other type of display device, which may display messages to a user.

Applications 124 may be utilized to perform general purpose applications such as to retrieve data from storage or as in certain embodiments, applications 124 may power and control an E-INK® display integrated into the payment card. Thus, applications 124 may be utilized for display of messages on a display device of payment card 120 using control and display component 122. However, in other embodiments, control and display component 122 may include specially designed hardware components capable of outputting received messages without additional software processing. In various embodiments, applications 124 may further be utilized to provide additional functionality, such as data processing and/or storage, and communications and messaging, and/or configuration of payment card identifiers for an associated payment account used when processing payment card 120.

Database 126 may be stored to a non-transitory memory of payment card 120 and may store identifiers for use during a transaction to provide a payment for the transaction. In this regard, database 126 may be accessible by applications 124 on request for an identifier received by communication module 128. In other embodiments, database 126 may correspond to a non-transitory memory component connected to an antenna of communication module 128 that may provide a stored identifier on activation of the antenna by a querying signal. Moreover, database 126 may further be used to store received messages from merchant device 130, which may be displayed using control and display component 122 and/or communicated to communication device 110. Thus, database 126 may include one or more data structures for stored messages and other received data through communication module 128.

Payment card 120 may also contain a communication module 128, which may be utilized to exchange data between payment card 120 and merchant device 130 or other data transfer elements, such as communication device 110. Thus, communication module 128 may communicate with nearby devices using short range communications, such as Bluetooth Low Energy, LTE Direct, WiFi, radio frequency, infrared, Bluetooth, and near field communications. In various embodiments, payment card 120 may further provide wired and/or network communications. Communication module 128 may correspond to an active or passive antenna capable of responding to and/or receive data transfers from merchant device 130, including receipt of messages for display using control and display component 122.

Merchant device 130 may be maintained, for example, by a merchant corresponding to a merchant location, which may offer one or more items for purchase through merchant location 130. In this regard, merchant device 130 include one or more processing applications which may be configured to interact with communication device 110, payment card 120, and/or payment provider server 150 to facilitate generation of a transaction and payment to the merchant for the transaction. In various embodiments, merchant device 130 may also correspond to devices offering online sale of items, which the user may purchase while at a merchant location. However, in other embodiments, merchant device 130 may be maintained by or include any merchant, including merchants that offer offline sales of items through a merchant location. Merchant device may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Moreover, in various embodiments, one or more of the applications, processes, and/or features discussed below in reference to merchant device 130 may be included in one or more merchant servers. Moreover, although only a single merchant device is references herein, a plurality of merchant devices may function similarly.

Merchant device 130 of FIG. 1 contains a sales application 140, card messaging application 132, other applications 134, a database 136, and a communication module 138. Sales application 140 and other applications 134 may correspond to processes, procedures, and/or applications executable by a hardware processor, for example, a software program. In other embodiments, merchant device 130 may include additional or different modules having specialized hardware and/or software as required.

Sales application 140 may correspond to one or more processes to execute modules and associated specialized hardware of merchant device 130 that provides an interface and/or online marketplace to sell one or more items offered by a merchant (not shown) associated with merchant device 130, and further provide checkout and payment processes for a transaction to purchase the items for sale from the merchant corresponding to merchant device 130. In this regard, sales application 140 may correspond to specialized hardware and/or software of merchant device 130 to provide a convenient interface to permit a merchant offer items for sale. For example, sales application 140 may be implemented as an application offering items for sale that may be utilized by the merchant or a merchant employee to enter items selected by a user to a transaction, determine a price for the transaction, and initiate a checkout and payment process for the transaction. In other embodiments, sales application 140 may be accessed by communication device 110 to select the items for sale to the user associated with communication device 110. Thus, merchant device 130 may be local to a physical merchant location and provide transaction processing processes through interfaces displayed to a merchant or merchant employee at the merchant location.

Sales application 140 may include information for a price for the item, a discount for the item, a price change for the item, and/or other incentives for items and/or with the merchant corresponding to merchant device 130 (e.g., rebates, payments, etc.). The sales data and other item data may be retrievable by communication device 110 and/or payment provider server 150, such as requestable through an API call, retrievable from a database, and/or scraped from an online resource. The information may be based updated periodically or continuously, such as in real time and information for the item(s) for sale changes. Sales application 140 may also include merchant information, such as a merchant location, payment mechanisms accepted by the merchant, and other relevant data for a merchant. Sales application 140 may be used to establish a transaction once the user associated with communication device 110 has selected one or more items for purchase. Once a payment amount is determined for the transaction for the item(s) to be purchased, sales application 140 may request payment from the user. Sales application 140 may receive an identifier from payment card 120, which may be utilized to receive a payment using a payment processing system, such as payment provider server 150. The identifier may be received through entry of data to sales application 140, for example, using a magnetic card reader, NFC chip reader, entry of an identifier code, or other data input. Thus, sales application 140 may interface with backend payment processing systems to send a payment to an account of the merchant associated with merchant device 130 by providing the identifier from payment card 120 with transaction information for processing as a payment request. In such embodiments, the payment request may be processed, payment provided to the merchant account, and notification of payment (or failure, for example, where there are insufficient user funds) may be sent to sales application 140. The payment may be made by payment provider server 150 on behalf of the user associated with communication device 110. Sales application 140 may then receive the results of the transaction processing, and complete the transaction with the user, for example, by providing the user the items for the transaction or declining the transaction where the user is not authenticated or the transaction is not authorized (e.g., insufficient funds).

Card messaging application 132 may correspond to one or more processes to execute modules and associated specialized hardware of merchant device 130 that generates messages from the results of transaction processing using sales application 140 and communicates the messages to payment card 120 for output using payment card 120. In this regard, card messaging application 132 may correspond to specialized hardware and/or software of merchant device 130 to access transaction results from a transaction processed using sales application 140 based on an identifier provided by payment card 120. For example, payment card 120 may be swiped, read, or otherwise entered to merchant device 130 causing an identifier for payment card 120 to be retrieved and loaded to sales application 140 for processing with a transaction generated by sales application 140. The identifier may be processed with the transaction by a payment processing entity, such as payment provider server 150. Thus, a payment may either be approved or denied, and the results communicated to sales application 140. Card messaging application 132 may access the results and generate a message using the results.

The message generated by card messaging application 132 may include the results of the transaction processing, such as an approval or denial of the transaction. The message may further include an amount approved or declined for the transaction. Moreover, additional information may be included in the message, such as merchant information, transaction information, a number of transactions or attempted processing of the identifier for payment card 120, various coded messages (e.g., color coded for debit or credits), applied benefits, savings, and/or other transaction or payment information. In various embodiments, card messaging application 132 may also configure the message with a time or location based limit for display of the message on payment card 120. However, in other embodiments, payment card 120 may determine a display time or length to display the message. Additionally, the message may include further information which may be obscured from display on payment card 120, such as account identifiers, merchant information, transaction information, or other data that may be included in the message for data storage and/or retrieval by another device.

Card messaging application 132 may then communicate the message to payment card 120. Card messaging application 132 may utilize communication module 138 to communicate the message to payment card 120 over short range wireless communications, such as Bluetooth, BLE, NFC, WiFi, LTE Direct, radio, microwave, infrared, or other communication channel or protocol. In other embodiments, one or more wireless beacons may be connected to merchant device 120 and perform the data transfer of the message. For example, in one embodiment, one or more wireless beacons may be implemented as a dongle device including a hardware processor and a communication module, for example, connected to merchant device 130. One or more wireless beacons may also be implemented as a device incorporated within a personal computer (PC), a smart phone, laptop computer, and/or other types of computing devices capable of transmitting and/or receiving data, such as an IPAD® from APPLE®. One or more wireless beacons may also act as a stand-alone device including a processor, communication module, and/or network interface component configured to communicate with payment card 120, merchant device 130, and/or payment provider server 150.

In order to establish a communication channel, card messaging application 132 may utilize short range wireless communications to transmit the requests to establish a connection, including an identifier such as a Universally Unique Identifier (UUID). If payment card 120 receives a request to establish the connection and responds with a payment card identifier (potentially including the UUID and other information necessary to effectuate communication with payment card 120), the communication module may cause payment card 120 to ramp up in power and create a connection between payment card 120 and merchant device 130 or the wireless beacon(s). Card messaging application 132 may transmit the request to establish the connection as a short range wireless communication (e.g. a BLE protocol communication) including a "wake up" process for payment card 120. In other embodiments, the request and/or connection may utilize near field communication, radio communication, infrared communication, Bluetooth communication, or WiFi communication. Additionally, although merchant device 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to merchant device 130 (e.g., payment card 120) and establishment of a connection for data transfers.

After the communication module receives payment card data (e.g., issuer and payment card type) from payment card 120, card messaging application 132 connected to payment card 120 may pass the message to payment card 120 using communication module 138 and/or the wireless beacon. Additionally, the communication module may cause the wireless beacon(s) to keep a communication channel open with payment card 120 for passing additional information between payment card 120, merchant device 130, and/or payment provider server 150. Card messaging application 132 may utilize communication module 138 and/or wireless beacons to determine a location of payment card 120 and/or cause wiping of a message on disconnection of the communication channel.

In other embodiments, the user's payment card 120 may include an RFID or similar passive device to receive certain frequency communications that are associated with a particular payment card/issuer (e.g., a Visa card containing an RFID tag responsive at Visa's set frequency). If merchant device 130 is programmed to broadcast the message at the certain frequency of a particular payment card/issuer (or any other type of communication causing a response with a passive RFID tag), then when the user's payment card 120 associated with the particular payment card/issuer is in range of the message, the card may respond by activating an LED, electronic ink, LCD, or other display contained on the payment card 120 to turn on and display the message.

Merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 160, or other types of applications. Other applications 134 may also include email, texting, voice and IM applications that allow a user to send and receive emails, calls, texts, and other notifications through network 160. In various embodiments, other applications 134 may include financial applications, such as banking, online payments, money transfer, or other applications associated with payment provider server 150. Other applications 134 may contain software programs, executable by a processor, including a graphical user interface (GUI) configured to provide an interface to the user.

Merchant device 130 may further include database 136 which may include, for example, identifiers such as operating system registry entries, cookies associated with sales application 140 and/or other applications 134, identifiers associated with hardware of merchant device 130, or other appropriate identifiers, such as identifiers used for payment/ user/device authentication or identification. Identifiers in database 136 may be used by a payment/credit provider, such as payment provider server 150, to associate merchant device 130 with a particular account maintained by the payment/credit provider. Merchant, item, sales, and/or benefit information for items sold by the merchant associated with merchant device 130 may be stored to database 136. Database 136 may further include transaction information and/or results, including transaction histories, as well as messages for payment card 120 generated using the transaction histories.

Merchant device 130 includes at least one communication module 138 adapted to communicate with communication device 110, payment card 120, and/or payment provider server 150. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 150 may be maintained, for example, by an online service provider, which may provide payment and financial services to a user. In this regard, payment provider server 150 includes one or more processing applications which may be configured to interact with communication device 110, merchant device 130, and/or another device/server to provide transaction processing, account services, and other financial processes. In one example, payment provider server 150 may be provided by PAYPAL®, Inc. of San Jose, Calif. However, in other embodiments, payment provider server 150 may be maintained by or include another type of service provider, which may provide connection services to a plurality of users.

Payment provider server 150 of FIG. 1 includes a transaction processing application 152, other applications 154, a database 156, and a network interface component 158. Transaction processing application 152 and other applications 154 may correspond to executable processes, procedures, and/or applications with associated hardware. In other embodiments, payment provider server 150 may include additional or different modules having specialized hardware and/or software as required.

Transaction processing application 152 may correspond to one or more processes to execute software modules and associated specialized hardware of payment provider server 150 to provide payment services to merchants and users, for example though a payment account and/or payment instruments. In this regard, transaction processing application 152 may correspond to specialized hardware and/or software to provide payment services and payment accounts, including digital wallets storing payment instruments. The payment services may allow for a payment to the merchant by a user through a payment instrument, including a credit/debit card, banking account, payment account with payment provider server 150, and/or other financial instrument. In order to establish a payment account for a merchant and/or user to send and receive payments, transaction processing application 152 may receive information requesting establishment of the payment account. The information may include user personal and/or financial information. Additionally the information may include a login, account name, password, PIN, or other account creation information. The merchant/ user may provide a name, address, social security number, or other personal information necessary to establish the account and/or effectuate payments through the account. Transaction processing application 152 may further allow the merchant/user to service and maintain the payment account, for example, by adding and removing payment instruments. In various embodiments, one of the payment instruments and/or the payment account may be associated with payment card 120, for example, by providing an identifier for use with payment card 120.

Transaction processing application 152 may be used to provide a payment for an item to a merchant, for example, between communication device 110 and merchant device 130. Transaction processing application 152 may debit an account of the user automatically and provide the payment to an account of the merchant. Transaction processing application 152 may also be used to provide transaction histories for processed transactions. Based on the transaction processing, messages may be generated by merchant device 130. However, in other embodiments, the messaging features described herein with reference to merchant device 130 may instead or also be incorporated within transaction processing application 152.

In various embodiments, payment provider server 150 includes other applications 154 as may be desired in particular embodiments to provide features to payment provider server 134. For example, other applications 154 may include security applications for implementing server-side security features, programmatic client applications for interfacing with appropriate application programming interfaces (APIs) over network 150, or other types of applications. Other applications 154 may contain software programs, executable by a processor, including a graphical user interface (GUI), configured to provide an interface to the user when accessing payment provider server 150, where the user or other users may interact with the GUI to more easily view and communicate information. In various embodiments, other applications 154 may include connection and/or communication applications, which may be utilized to communicate information to over network 150.

Additionally, payment provider server 150 includes database 156. As previously discussed, the user and/or the merchant corresponding to telecommunication carrier server 170 may establish one or more digital wallets and/or payment accounts with payment provider server 150. Digital wallets and/or payment accounts in database 156 may include user information, such as name, address, birthdate, payment instruments/funding sources, additional user financial information, user preferences, and/or other desired user data. Users may link to their respective digital wallets and/or payment accounts through an account, user, merchant, and/ or device identifier. Thus, when an identifier is transmitted to payment provider server 150, e.g., from communication device 110, one or more digital wallets and/or payment accounts belonging to the users may be found. Database 156 may also store the user preferences for an account for the user and/or merchant.

In various embodiments, payment provider server 150 includes at least one network interface component 158 adapted to communicate communication device 110 and/or merchant device 130 over network 150. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
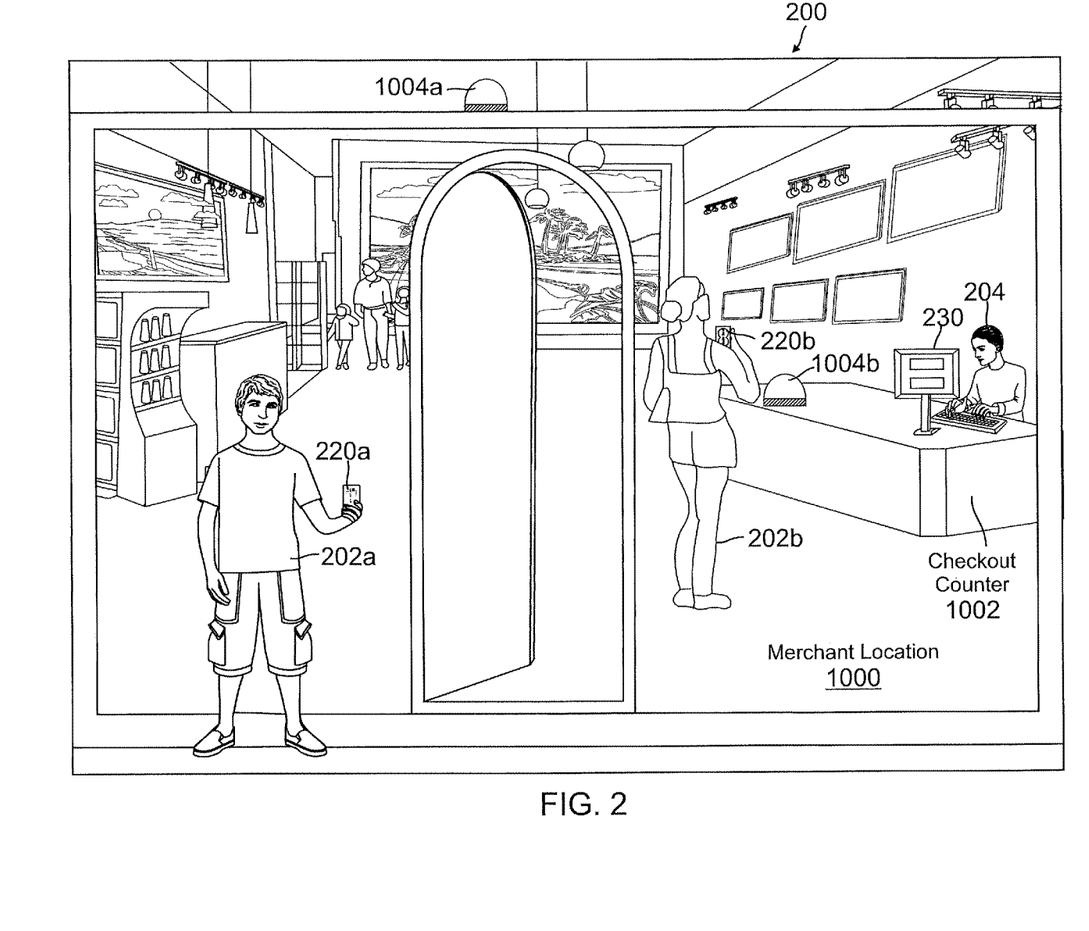
FIG. 2 is an exemplary environment having a payment card with a display device displaying transaction processing results to a user during a merchant checkout process, according to an embodiment.

FIG. 2 is an exemplary environment having a payment card with a display device displaying transaction processing results to a user during a merchant checkout process, according to an embodiment. Environment 200 of FIG. 2 includes a user 202*a* having a payment card 220*a* and a user 202*b* having a payment card 220*b* corresponding generally to a user having payment card 120, respectively, in FIG. 1. Environment 200 also includes a merchant device 230 corresponding generally to merchant device 130 of FIG. 1.

In environment 200, user 202*a* and user 202*b* may each visit merchant location 1000 to select one or more items for purchase. For example, user 202*a* and user 202*b* may shop and review items at merchant location 1000 and bring the item(s) selected for purchase to checkout counter 1002 in order to engage in a transaction with a merchant employee 204 for the items selected for purchase. For example, user 204*b* is shown as located at checkout counter 1002 and may wish to purchase items from merchant employee 204. When checking out for the items, user 204*b* is required to provide payment for the items. In this regard, user 204*b* may provide payment card 220*b* for payment of the transaction. Payment card 220*b* may be entered to the transaction, for example, by scanning or reading payment card 220*b* to enter an identifier for payment card 220*b* to the transaction. The transaction may then be processed and payment provided to the merchant using the identifier for payment card 220*b*. Such processing may utilize merchant device 230 for entry of the identifier and communication with a payment processing gateway.

Additionally, a message for display on a display device of payment card 220*b* may be determined by merchant device 230 after transaction processing. The message may include the results of the transaction, such as a successful or denied payment, as well as the payment amount or other information. While user 202*b* is located at checkout counter 1002, the message may be communicated to payment card 220*b* and output to user 202*b* for viewing by user 202*b* at merchant location 1000. Thus, user 202*b* may check to make sure the transaction was correctly processed. The message may be communicated to payment card 220*b* by merchant device 230, for example, using short range wireless communications. However, in other embodiments, merchant location 1000 uses a wireless beacon 1004*a* and/or a wireless beacon 1004*b* to communicate with payment card 220*b*. Thus, wireless beacon 1004*b* nearby checkout counter 1002 may be used to communicate the message to payment card 220*b*

The message may be displayed on payment card 220*b* for a limited amount of time, such as 5 minutes or until payment card 220*b* is further used in another transaction. In other embodiments, the message may be displayed while user 204*b* is located at merchant location 1000. For example, wireless beacon 1004*b* may transmit the message to payment card 220*b* for display while payment card 220*b* is in connection with wireless beacon 1004*b* and/or receiving the message. Wireless beacon 1004*a* may further be located at an entrance or exit of merchant location 1000. Wireless beacon may be configured to transmit the message to payment card 220*b* until user 204*b* is out of range of wireless beacon 1004*a*. For example, user 204*a* is located outside of merchant location 1000 with payment card 220*a*. Thus, a message for payment card 220*a* of a transaction user 204*a* engaged in at merchant location 1000 may be wiped from payment card 220*a* when user 204*a* is outside of the range of wireless beacon 1004*a*. In other embodiments, wireless beacon 1004*a* may instead transmit a signal to wipe or erase any messages displayed on payment card 220*a* when user 202*a* passes by wireless beacon 1004*a* and payment card 220*a* receives the signal from wireless beacon 1004*a*.

Figure 3:
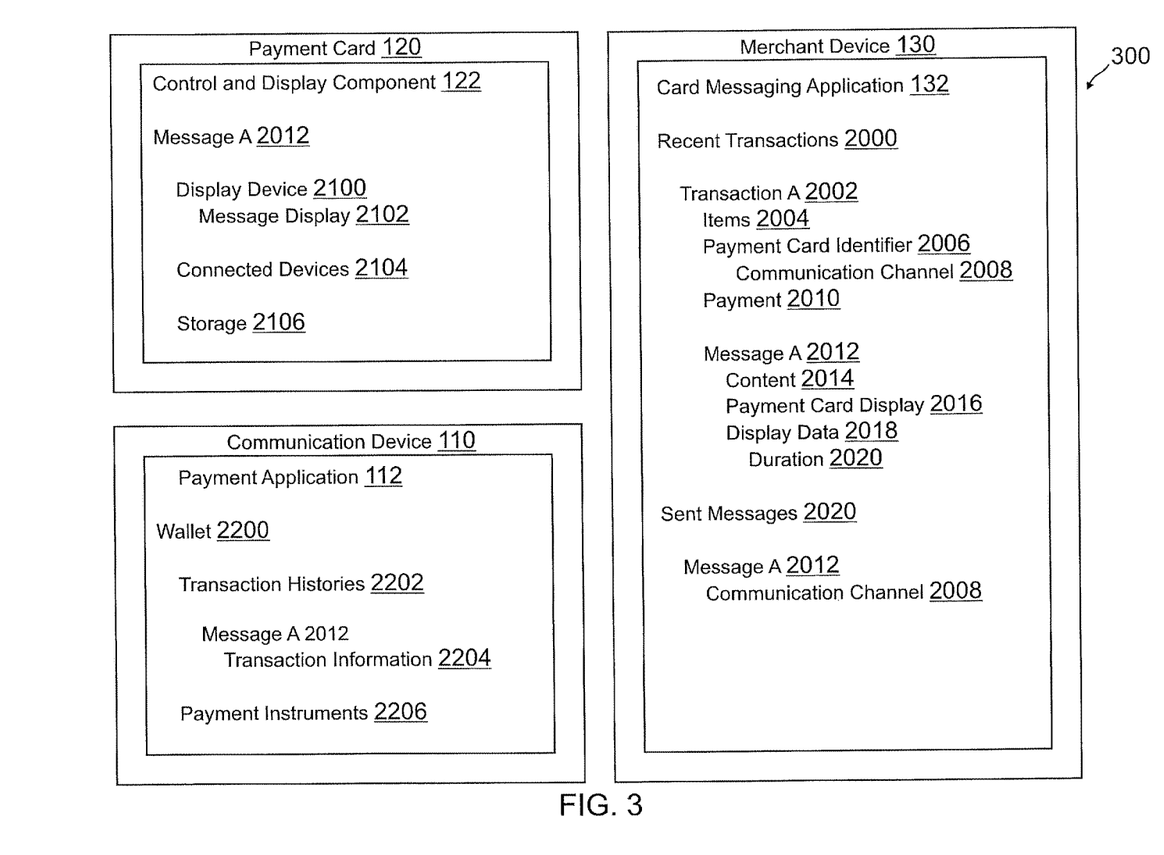
FIG. 3 is an exemplary system environment having a payment card with a display device, merchant device, and payment provider for display of a transaction history using a payment card display device for secure transaction processing, according to an embodiment.

FIG. 3 is an exemplary system environment having a payment card with a display device, merchant device, and payment provider for display of a transaction history using a payment card display device for secure transaction processing, according to an embodiment. Environment 300 of FIG. 3 includes communication device 110, payment card 120, and merchant device 130 all discussed in reference to environment 100 of FIG. 1.

Merchant device 130 executes card messaging application 132 corresponding generally to the specialized hardware and/or software modules and processes described in reference to FIG. 1. In this regard, card messaging application 132 may determine one or more messages to communicate to payment card 120 after processing a transaction using an identifier for a payment instrument provided by payment card 120. Thus, card messaging application 132 includes recent transactions 2000 and sent messages 2020. Recent transactions 2000 includes a transaction A 2002, which may correspond to the transaction processed using payment card 120. For example, transaction A 2002 includes items 2004 selected for purchase, as well as a payment card identifier 2006 for payment card 120. Payment card identifier 2006 may be associated with a communication channel 2008 used to communicate with payment card 120. Additionally, transaction A 2002 includes a payment 2010 processed using payment card identifier 2006.

Card messaging application 132 further includes a message A 2012 for transmission to payment card 120. Message A 2012 includes content 2014 for output and display through a display device of payment card 120. Content 2014 may include the results of payment 2010. Additionally, message A 2012 is generated using payment card display 2016 that may be used to determine content 2014 and how to display content 2014. Display data 2018 may further be determined for message A 2012, such as a duration 2020 for display of message A 2012. Card messaging application 132 may further include sent messages 2020, which may include message A 2012 sent over communication channel 2008.

Payment card 120 includes a control and display component 122 corresponding generally to the specialized hardware and/or software modules and processes described in reference to control and display component 122 of FIG. 1. In this regard, control and display component 122 includes received messages, such as message A 2012. Message A 2012 may be output through display device 2100, such as an electronic ink or paper display, an LED display, an LCD display, or other type of display device. For example, message display 2102 may be determined using message A 2012 and the parameters for display device 2100. Message A 2012 may further be associated with connected devices 2104 connected to payment card 120, which may include merchant device 130 transmitting message A 2012 to payment card 120 and/or communication device 110 for storage of message A 2012. In other embodiments, storage 2106 of payment card 120 may be used for storage of message A 2012.

Communication device 110 executes payment application 112 corresponding generally to the specialized hardware and/or software modules and processes described in reference to FIG. 1. In this regard, payment application 112 may receive messages from payment card 120. For example, payment card 120 may communicate message A to communication device 110. Payment application 112 includes a wallet 2200, such as a digital wallet associated with an online payment account for a user. Wallet 2200 includes transaction histories 2202, which may correspond to receipts for transactions processed using one or more payment instruments in wallet 2200. Thus, message A 2012 may be stored with transaction histories 2202, and may include transaction information 2204. Additionally, payment instruments 2206 may be stored with wallet 2200, which may include an identifier for payment card 120.

Figure 4:
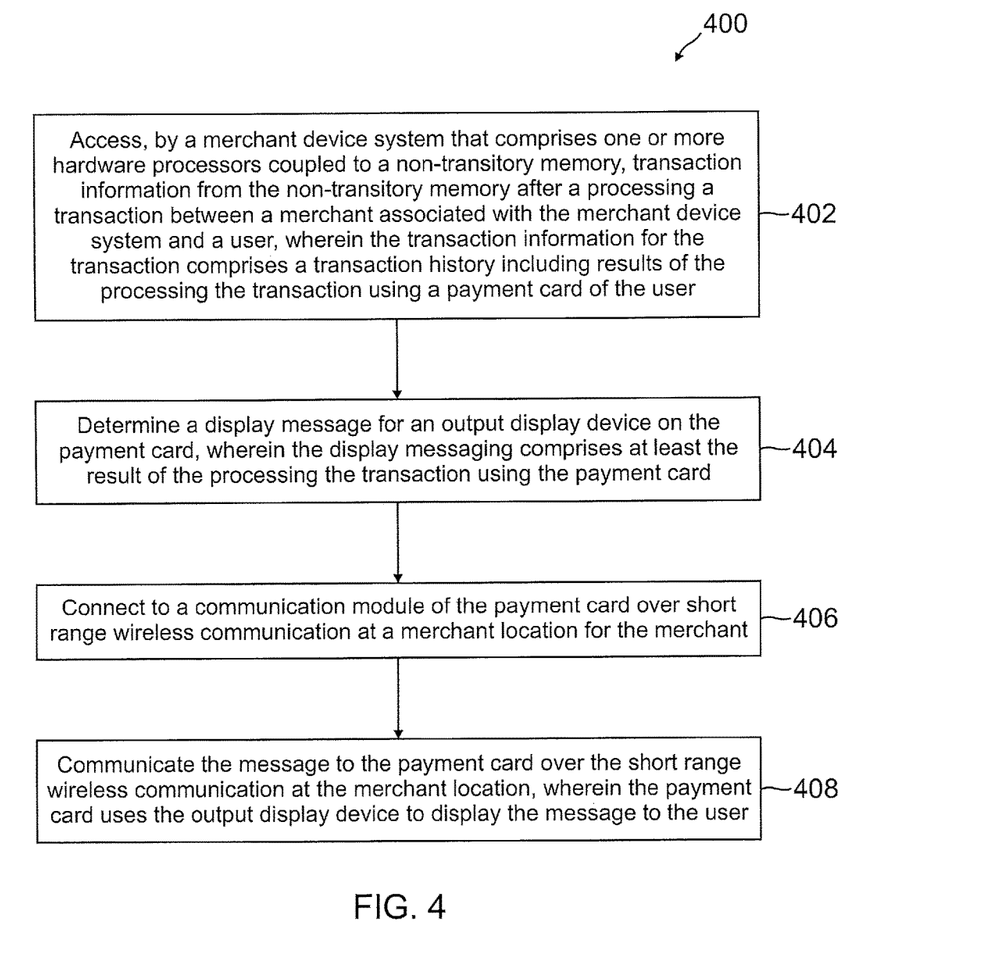
FIG. 4 is a flowchart for display of a transaction history using a payment card display device for secure transaction processing, according to an embodiment.

FIG. 4 is a flowchart for display of a transaction history using a payment card display device for secure transaction processing, according to an embodiment. Note that one or more steps, processes, and methods described herein may be omitted, performed in a different sequence, or combined as desired or appropriate.

At step 402, transaction information is accessed, by a merchant device system that comprises one or more hardware processors coupled to a non-transitory memory, from the non-transitory memory after processing a transaction between a merchant associated with the merchant device system and a user, wherein the transaction information for the transaction comprises a transaction history including results of the processing the transaction using a payment card of the user. The payment card may comprise a contactless smart payment card. An online payment provider may process the transaction between the user and the merchant using a payment account linked to the payment card. In other embodiments, the payment card comprises one of a debit card and a credit card, wherein a financial institution processes the transaction between the user and the merchant on receipt of a card identifier for the one of the debit card and the credit card from the merchant device system.

A display message for an output display device on the payment card is determined, wherein the display messaging comprises at least the result of the processing the transaction using the payment card, at step 404. The output display device may be one of an electronic ink display and a liquid crystal display. The message may further comprise an amount processed and paid to the merchant from an account associated with the payment card for the user. In further embodiments, the message further comprises at least one item purchased by the user in the transaction with the merchant. The message may also include a payment provider used during the processing the transaction between the user and the merchant, wherein the payment provider provides a payment to the merchant from an account of the user with the payment provider. In order to prevent against fraud, the message may comprise a number of payments processed at the merchant location using the payment card, wherein the output display device of the payment card further displays the number of payment processed at the merchant location. At step 406, the merchant device system connects to a communication module of the payment card over short range wireless communication at a merchant location for the merchant. In various embodiments, connecting to the communication module of the payment card uses one of near field communication, Bluetooth communication, Bluetooth Low Energy (BLE) communication, WiFi communication, and LTE Direct communication.

The message is communicated to the payment card over the short range wireless communication at the merchant location, wherein the payment card uses the output display device to display the message to the user, at step 408. The message may be displayed on the output display device of the payment card for a preset amount of time. In other embodiments, the message is displayed on the output display device of the payment card until the merchant device system at the merchant location disconnects from the communication module of the payment card. The message may be displayed on the output display device of the payment card by activation of at least one LED contained on the payment card. The message may also or otherwise be displayed on the output display device of the payment card by a text message presented on the output display device. The message may be stored to a card non-transitory memory for the payment card, and wherein the message is retrievable from the card non-transitory memory by a device for the user. Additionally, the payment card may communicate the message to mobile device for the user for storage in a device non-transitory memory for the mobile device. For example, the payment card may communicate the message to a mobile device executing a payment application associated with the payment card, wherein the payment application updates payment card information for the payment card with the message. The payment application executing on the mobile device may also upload the message to an online digital wallet for the user, and wherein the online digital wallet comprises transaction histories for the user and the payment card.

Figure 5:
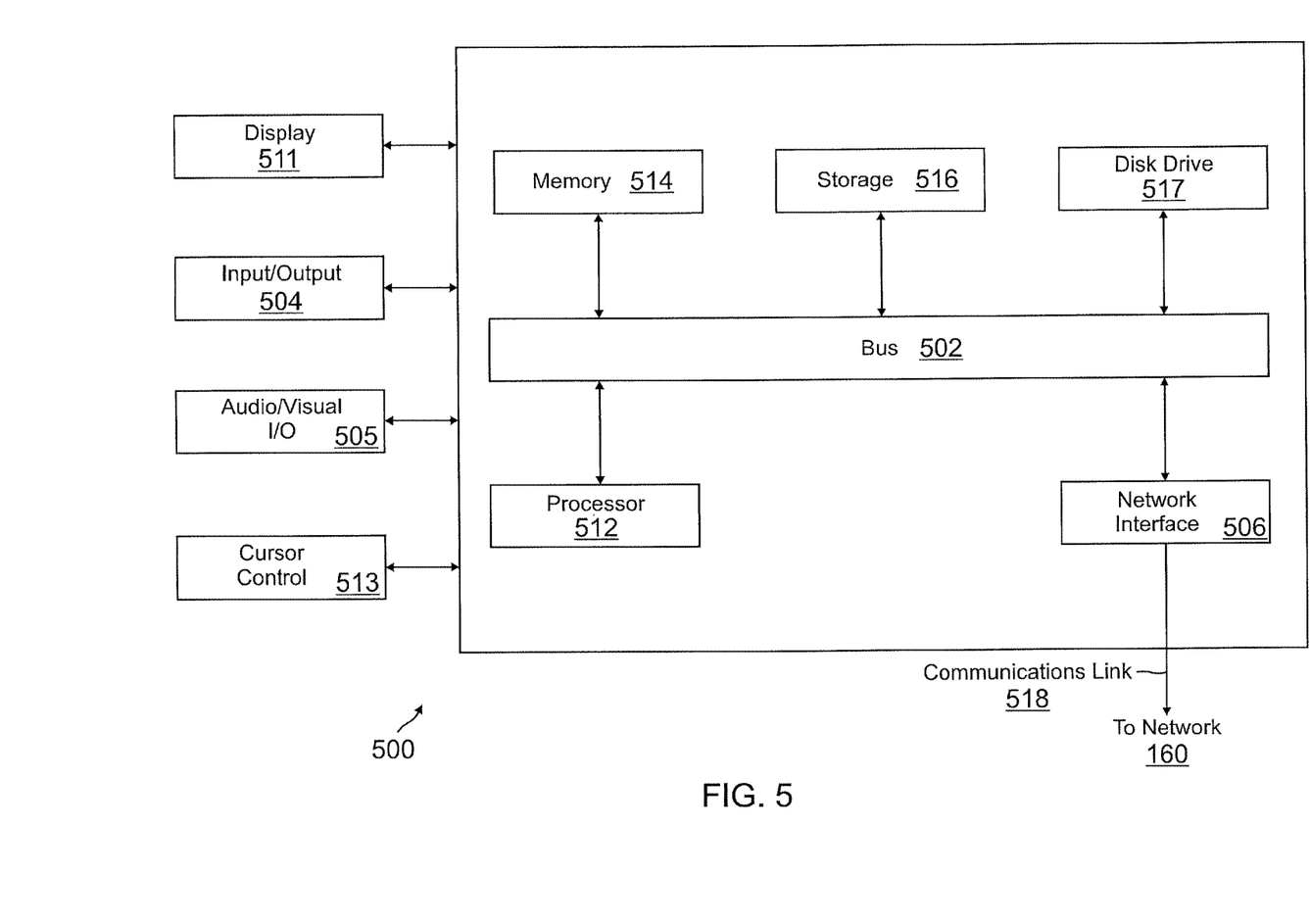
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the payment card may comprise a contactless smart card providing a controller, a memory and an antenna capable of transferring and receiving data using a near field communications capability for communication with wireless beacons or other wireless protocol devices (e.g., a smart phone). The merchant and/or payment service provider may utilize a network computing device (e.g., a network server) capable of communicating with the network. It should be appreciated that each of the devices utilized by users, merchants and payment service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A merchant device system comprising:
   a non-transitory memory; and
   one or more hardware processors coupled to the non-transitory memory and configured to read instructions from the non-transitory memory to cause the merchant device system to perform operations comprising:
   in response to processing a transaction between a merchant associated with the merchant device system and a user, determining a transaction history for the transaction, wherein the transaction history comprises results of the processing;
   generating a message for an output display device on a payment card used with the transaction and based on the transaction history, wherein the message comprises the results of the processing;
   broadcasting a merchant identifier for the merchant device system over short range wireless communications at a merchant location for the merchant;
   receiving a payment card identifier from the payment card from short range wireless communications with a communication module of the payment card;
   authenticating the payment card based on the payment card identifier;
   communicating the message to the payment card over the short range wireless communications at the merchant location;
   detecting the payment card within a wireless proximity range of a short range wireless beacon at the merchant location; and
   in response to the detecting, transmitting a removal request to erase the message from the output display device to the communication module of the payment card using the short range wireless beacon.

2. The merchant device system of claim 1, wherein the payment card comprises a contactless smart payment card.

3. The merchant device system of claim 1, wherein the short range wireless communications comprise one of near field communication, Bluetooth communication, Bluetooth Low Energy (BLE) communication, WiFi communication, or LTE Direct communication.

4. The merchant device system of claim 1, wherein the message is displayed on the output display device of the payment card for a preset amount of time at the merchant location.

5. The merchant device system of claim 1, wherein the message is displayed on the output display device of the payment card by activation of at least one LED contained on the payment card.

6. The merchant device system of claim 1, wherein the message is displayed on the output display device of the payment card by a text message presented on the output display device.

7. The merchant device system of claim 6, wherein the output display device is one of an electronic ink display or a liquid crystal display.

8. The merchant device system of claim 1, wherein the message further comprises an amount processed and paid to the merchant from an account associated with the payment card for the user.

9. The merchant device system of claim 1, wherein the message further comprises at least one item purchased by the user in the transaction with the merchant.

10. The merchant device system of claim 1, wherein the message further comprises a payment provider used during the transaction, and wherein the payment provider provides a payment to the merchant from an account of the user with the payment provider.

11. The merchant device system of claim 1, wherein the message is stored in a card memory of the payment card, and wherein the message is retrievable from the card memory by a device for the user.

12. The merchant device system of claim 1, wherein the payment card communicates the message to a mobile device for the user for storage in a device memory for the mobile device.

13. The merchant device system of claim 1, wherein the short range wireless beacon is established at an exit of the merchant location, and wherein the removal request further comprises a storage request of the message to a mobile device associated with the payment card in response to the removal request.

14. A method comprising:
in response to processing, by a merchant device system that comprises one or more hardware processors coupled to a non-transitory memory, a transaction between a merchant associated with the merchant device system and a user, determining a transaction history for the transaction, wherein the transaction history comprises results of the processing;
generating a message for an output display device on a payment card used in the transaction and based on the transaction history, wherein the message comprises the results of the processing;
broadcasting a merchant identifier for the merchant device system over short range wireless communications at a merchant location for the merchant;
receiving a payment card identifier from the payment card from short range wireless communications with a communication module of the payment card;
authenticating the payment card based on the payment card identifier;
communicating the message to the payment card over the short range wireless communications at the merchant location;
detecting the payment card within a wireless proximity range of a short range wireless beacon at the merchant location; and
in response to the detecting, transmitting a removal request to erase the message from the output display device to the communication module of the payment card using the short range wireless beacon.

15. The method of claim 14, wherein an online payment provider processes the transaction between the user and the merchant using a payment account linked to the payment card.

16. The method of claim 14, wherein the payment card comprises one of a debit card or a credit card, and wherein a financial institution processes the transaction between the user and the merchant on receipt of a card identifier for the one of the debit card or the credit card from the merchant device system.

17. The method of claim 14, wherein the message comprises a number of payments processed at the merchant location using the payment card, and wherein the output display device of the payment card further displays the number of payments processed at the merchant location.

18. The method of claim 14, wherein a mobile device executing a payment application associated with the payment card receives the message from the payment card, and wherein the payment application updates payment card information for the payment card with the message.

19. The method of claim 18, wherein the payment application executing on the mobile device uploads the message to an online digital wallet for the user, and wherein the online digital wallet comprises transaction histories for the user and the payment card.

20. A non-transitory machine-readable medium having stored thereon machine-readable instructions executable to cause a machine to perform operations comprising:
in response to processing, by a merchant device system that comprises one or more hardware processors coupled to a non-transitory memory, a transaction between a merchant associated with the merchant device system and a user; determining a transaction history for the transaction, wherein the transaction history comprises results of the processing;
generating a message for an output display device on a payment card used in the transaction and based on the transaction history, wherein the message comprises the results of the processing;
broadcasting a merchant identifier for the merchant device system over short range wireless communications at a merchant location for the merchant;
receiving a payment card identifier from the payment card from short range wireless communications with a communication module of the payment card;
authenticating the payment card based on using the payment card identifier;
communicating the message to the payment card over the short range wireless communications at the merchant location;
detecting the payment card within a wireless proximity range of a short range wireless beacon at the merchant location; and
in response to the detecting, transmitting a removal request to erase the message from the output display device to the communication module of the payment card using the short range wireless beacon.

* * * * *

UNITED STATES PATENT AND TRADEMARK OFFICE
CERTIFICATE OF CORRECTION

PATENT NO. : 10,346,827 B2  
APPLICATION NO. : 14/973559  
DATED : July 9, 2019  
INVENTOR(S) : Michael Charles Todasco Page 1 of 1

It is certified that error appears in the above-identified patent and that said Letters Patent is hereby corrected as shown below:

In the Claims

In Column 24, Line 45, delete "using"

Signed and Sealed this  
Twenty-ninth Day of October, 2019

Andrei Iancu  
*Director of the United States Patent and Trademark Office*